США005897632A

United States Patent [19]
Dar et al.

[11] Patent Number: 5,897,632
[45] Date of Patent: Apr. 27, 1999

[54] METHOD AND SYSTEM FOR USING MATERIALIZED VIEWS TO EVALUATE QUERIES INVOLVING AGGREGATION

[75] Inventors: Shaul Dar, Tel Aviv, Israel; Hosagrahar Visvesvaraya Jagadish, Berkeley Heights, N.J.; Alon Yitzchak Levy, Seattle, Wash.; Divesh Srivastava, Summit, N.J.

[73] Assignee: AT&T Corp, Middletown, N.J.

[21] Appl. No.: 08/895,024

[22] Filed: Jul. 16, 1997

Related U.S. Application Data

[60] Provisional application No. 60/024,635, Aug. 27, 1996.

[51] Int. Cl.⁶ .................................................... G06F 17/30
[52] U.S. Cl. ........................................ 707/2; 707/1; 707/3
[58] Field of Search ......................................... 707/1, 2, 3

[56] References Cited

U.S. PATENT DOCUMENTS

| | | | |
|---|---|---|---|
| 5,161,225 | 11/1992 | Abraham et al. | 707/103 |
| 5,276,870 | 1/1994 | Shan et al. | 707/2 |
| 5,600,831 | 2/1997 | Levy et al. | 707/2 |
| 5,655,116 | 8/1997 | Kirk et al. | 707/1 |
| 5,768,578 | 6/1998 | Kirk et al. | 1/1 |

OTHER PUBLICATIONS

E. N. Hanson, "A Performance Analysis Of View Materialization Strategies," Association for Computing Machinery Special Interest Group on Management of Data 1987 Annual Conference, San Francisco, CA, May 27–29, 1987, vol. 16, No. 3, ISSN 0163–5808, Sigmod Record, Dec. 1987, pp. 440–453.

J. Srivastava and D. Rotem, "Analytical Modeling of Materialized View Maintenance," Proceedings of the Seventh ACM Sigmod–Sigart Symposium on Principles of Database Systems, Austin, TX, Mar. 21–23, 1998, ISBN 0–89791–263–2, NY, NY, ACM, pp. 126–134.

Srivistava, J. et al. "Analytical Modeling of Materialized View Maintenance," *Proceedings of the Seventh ACM Sigact–Sigmod–Sigart Symposium on Principles of Database Systems*, Austin, TX, USA, Mar. 21–23, 1998, pp. 126–134.

Hanson, E.M. "A Performance Analysis of View Materialization Strategies," *Association for Computing Machinery Special Interest Group on Management of Data*. 1987 Annual Conference, San Francisco, CA, USA, May 27–29, 1987. Vol. 16, No. 3., pp. 440–453.

Sellis, "Intelligent Caching and Indexing Techniques for Relational Database Systems", Inform Systems, vol. 13, No. 2, pp. 175–185, 1988.

Gupta et al., "Adapting Materialized Views after Redefinitions", Sigmond, 95, pp. 211–222, 1995.

Gupta et al. "Aggregate–Query Processing Data Warehousing Environments", VLDB Conference, pp. 358–369, 1995.

Levy et al. "Answering Queries Using Views", pp. 95–104, 1995.

(List continued on next page.)

*Primary Examiner*—Paul R. Lintz

[57] ABSTRACT

The present invention is a method and system for using materialized views to compute answers to SQL queries with grouping and aggregation. A query is evaluated a using a materialized view. The materialized view is semantically analyzed to determine whether the materialized view is usable in evaluating an input query. The semantic analysis includes determining that the materialized view does not project out any columns needed to evaluate the input query and determining that the view does not discard any tuple that satisfies a condition enforced in the input query. If the view is usable, the input query is rewritten to produce an output query that is multi-set equivalent to the input query and that specifies one or more occurrences of the materialized view as a source of information to be returned by the output query. The output query is then evaluated. The semantic analysis and rewriting may be iterated, with the output query of each iteration being the input query of the next iteration. The output query is evaluated after the last iteration.

30 Claims, 13 Drawing Sheets

OTHER PUBLICATIONS

Chaudhuri et al. "Optimizing Queries with Materialized Views", IEEE, pp. 190–200, 1995.

Chen et al. "The Implementation and Performance Evaluation of the ADMS Query Optimizer: Integrating Query Result Caching and Matching", Proceedings of EDBT, pp. 1–15, 1994.

Tsatalos et al. "The GMAP: A Versatile Tool for Physical Data Independence", VLDB Conference, pp. 367–378, 1994.

Stonebraker et al., "On Rules, Procedures, Caching and Views In Data Base Systems", pp. 281–290, 1990.

Yang, "Query Transformation for PSJ–queries", VLDB Conference, pp. 245–254, 1987.

Fig. 1c

| 120 Customer ||
|---|---|
| 121 Phone_Number | 122 Cust_Name |
| 1-800-555-1111 | John Doe |
| 1-800-555-2222 | Jane Doe |
|  |  |

123a → row with 1-800-555-1111
123b → row with 1-800-555-2222

Fig. 1d

| 130 Calls ||||||||
|---|---|---|---|---|---|---|---|
| 131 From | 132 To | 133 Time | 134 Day | 135 Month | 136 Year | 137 Duration | 138 Plan_Id | 139 Charge |
| # | # | 8:14 | 23 | 1 | 93 | 5 | 1 | 1.25 |
| # | # | 19:02 | 25 | 1 | 94 | 16 | 3 | 1.60 |
|  |  |  |  |  |  |  |  |  |

140a → first data row
140b → second data row

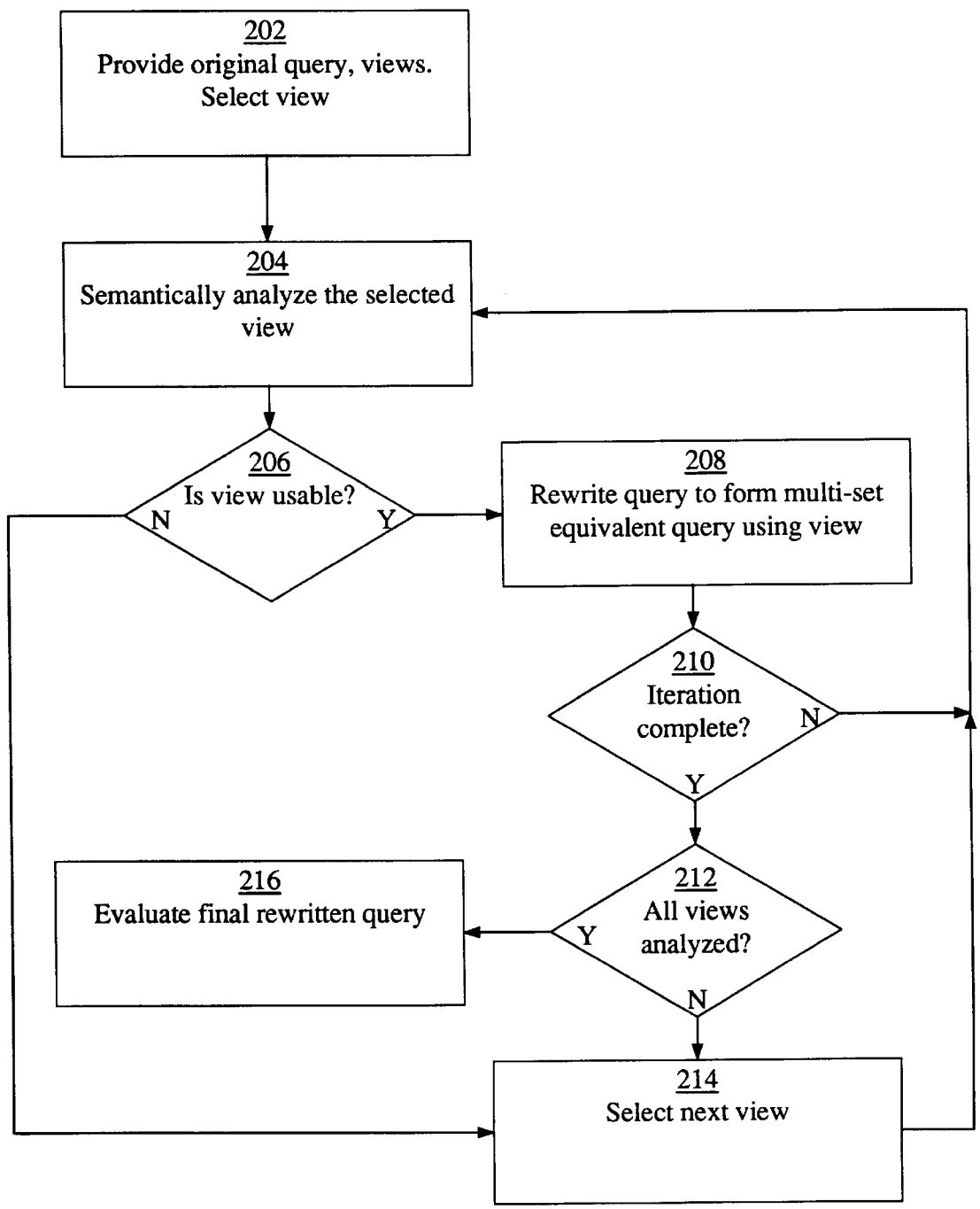

Condition $C_1$:

There is a 1-1 column mapping $\phi$ from V to Q

---

304

Condition $C_2$:

If a column A in *ColSel(Q)* ∪ *Groups(Q)* is a column in $\phi(Cols(V))$, then *Sel(V)* must have a column $B_A$ such that *Conds(Q)* implies $(A = \phi(B_A))$.

Note that this condition is satisfied if $B_A$ is $\phi^{-1}(A)$.

---

306

Condition $C_3$:

Suppose AGG(A) is in *Sel(Q)*. If column A is in $\phi(Cols(V))$, then

1. If AGG is *MIN*, *MAX* or *SUM*, then Sel(V) *must have a column $B_A$ such that Conds(Q) implies $(A = (B_A))$.*

2. If AGG *is COUNT, then* Sel(V) *must not be empty.*

---

308

Condition $C_4$:

There exists a Boolean combination of built-in predicates, Conds', such that:
1. *Conds(Q)* is equivalent to $\phi(Cols(V))$ & Conds'.
2. Conds' involves only the columns in $\phi(Sel(V)) \cup (Cols(Q) - \phi(Cols(V)))$.

Fig. 4

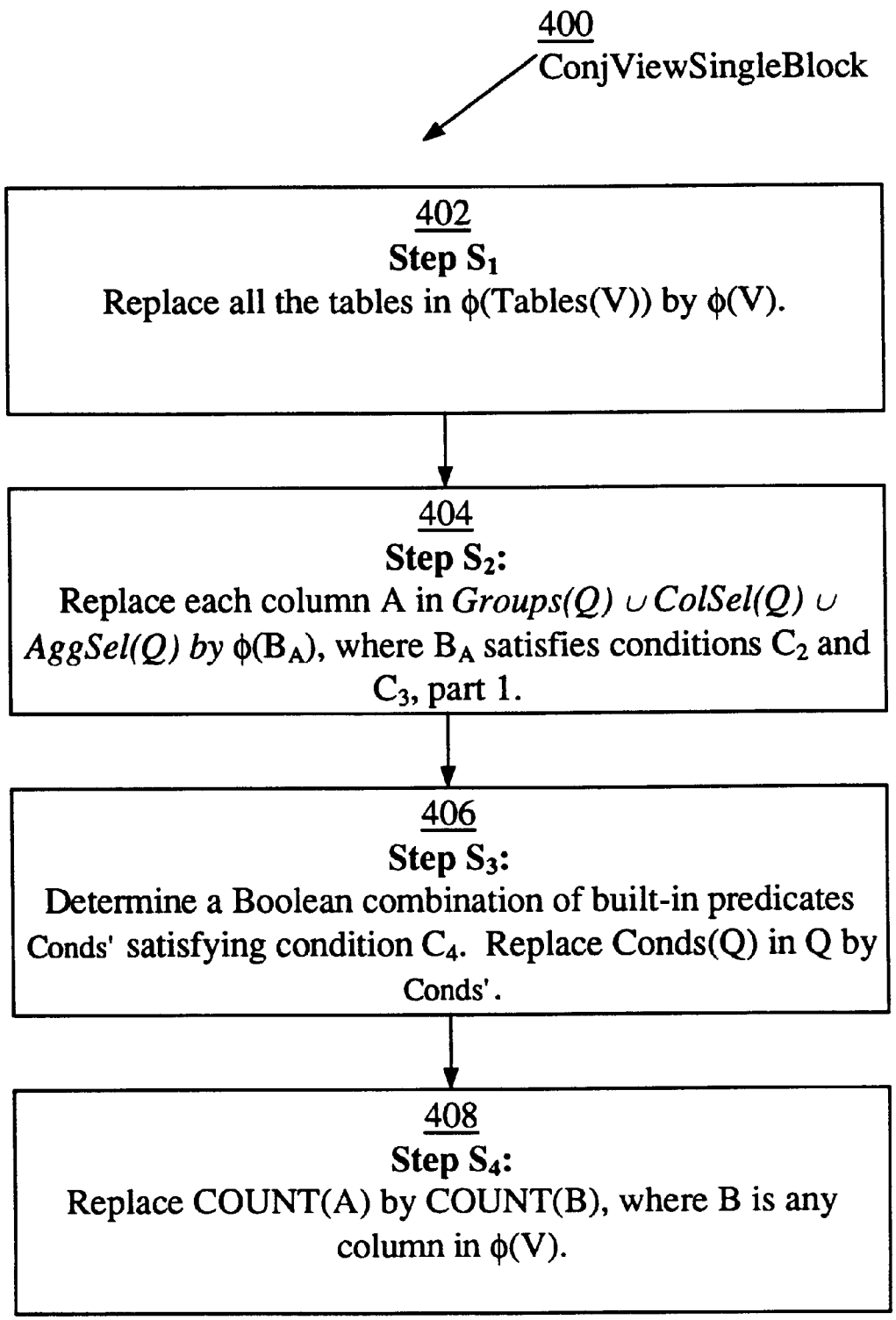

400 ConjViewSingleBlock

402
Step $S_1$
Replace all the tables in $\phi(Tables(V))$ by $\phi(V)$.

404
Step $S_2$:
Replace each column A in *Groups(Q)* ∪ *ColSel(Q)* ∪ *AggSel(Q)* by $\phi(B_A)$, where $B_A$ satisfies conditions $C_2$ and $C_3$, part 1.

406
Step $S_3$:
Determine a Boolean combination of built-in predicates Conds' satisfying condition $C_4$. Replace Conds(Q) in Q by Conds'.

408
Step $S_4$:
Replace COUNT(A) by COUNT(B), where B is any column in $\phi(V)$.

*Condition* $C_4^m$:

Let $Conds_1$ be $Conds(Q)$ & $\phi(Conds(V))$, and $Conds_2$ be $Conds(Q)$ & $\neg\phi(Conds(V))$. Then, 1. $Conds_1$ must be satisfiable.
2. There exists a Boolean combination of built-in predicates, Conds' such that:
   - (a) $Conds_1$ is equivalent to $(Conds(V))$ & Conds',
   - (b) Conds' involves only the columns in $\phi(Sel(V)) \cup (Cols(Q) - \phi(Cols(V)))$,
   - (c) $\Pi_{Group(Q)}(Conds_1)$ & $\Pi_{Group(Q)}(Conds_2)$ is FALSE.

Condition $C_3^h$:

Suppose AGG(A) is in *Sel(Q)* or in *GConds(Q)*. If column A is in $\phi Cols(V)$ then:

1. If AGG is MIN, MAX, or SUM, then *Sel(V)* must have a column $B_A$ such that *Conds(Q)* implies $(A = \phi(B_A))$.
2. If AGG is COUNT, then *Sel(V)* must not be empty.

902
**Condition $C_1^*$:**
Same as condition $C_1$.

---

904
**Condition $C_2^*$:**
If column A in *Groups(Q)* is a column in $\phi(Cols(V))$, then ColSel(V) must have a column $B_A$ such that *Conds(Q)* implies $(A = \phi(B_A))$.

---

906
**Condition $C_3^*$:**
Suppose AGG(A) is in *Sel(Q)*.
1. If column A is in $\phi(Cols(V))$, then:
   (a) If AGG is MIN or MAX, then there must exist a column $B_A$ in *Cols(V)* such that *Conds(Q)* implies $(A = \phi(B_A))$, and *Sel(V)* contains either the non-aggregation column $B_A$, or an aggregation column of the form $AGG(B_A)$.
   (b) If AGG is COUNT, then *Sel(V)* must include a column of the form $COUNT(A_0)$, where $A_0$ is a column in *Cols(V)*.
   (c) If AGG is SUM, then there must exist a column $B_A$ in *Cols(V)* such that *Conds(Q)* implies $(A = \phi(B_A))$, and *Sel(V)* contains either $B_A$ and a column of the form $COUNT(A_0)$, or an aggregation column of the form $AGG(B_A)$.
2. If column A is not in $\phi(Cols(V))$, and AGG is either SUM or COUNT, then *Sel(V)* must include a column of the form $COUNT(A_0)$, where $A_0$ is a column in *Cols(V)*.

---

908
**Condition $C_4^*$:**
There exists Conds', such that:
1. *Conds(Q)* is equivalent to $\phi(Conds(V))$ & Conds'
2. Conds' involves only the columns $\phi(ColSel(V))$ and the columns in *Cols(Q)* that are not in $Cols(\phi(V))$.

Fig. 10b

1008
Step $S'_4$:

Consider an aggregation column AGG(A) in Sel(Q) such that A is in $\phi(Cols(V))$.

1. Let AGG be MIN, MAX, or SUM. By condition $C'_3$, part 1, there are two cases to consider:
   (a) Suppose Sel(V) contains the aggregation column $AGG(B_A)$. Let S denote the corresponding column in $\phi$. Replace AGG(A) in Sel(Q) by AGG(S).
   (b) Suppose Sel(V) contains the non-aggregation column $B_A$.
   If AGG is either MIN or MAX, leave AGG(A) in Sel(Q) unchanged.
   If AGG is SUM, then by condition $C'_3$, part 1(c), Sel(V) must include a column of the form $COUNT(A_0)$. Let N denote the corresponding column in $\phi(V)$. Replace SUM(A) in Sel(Q) by SUM(A*N).
2. Let AGG be COUNT. By condition $C'_3$, part 1(b), Sel(V) must include a column of the form $COUNT(A_0)$. Let N denote the corresponding column in $\phi(V)$.
   Replace COUNT(A) in Sel(Q) by SUM(N).

1010
Step $S'_5$:

Consider an aggregation column AGG(A) in Sel(Q) such that column A is not $\phi(Cols(V))$.
   If AGG is MIN or MAX, leave AGG(A) unchanged
   If AGG is SUM or COUNT, do the following: By condition $C'_3$, part 2, Sel(V) must include a column of the form $COUNT(A_0)$. Let N denote the column $\phi(V)$ corresponding to that $COUNT(A_0)$ column.
   1. If AGG is COUNT, replace COUNT(A) in Sel(Q) by SUM(N).
   2. If AGG is SUM, replace SUM(A) in Sel(Q) by $SUM(A*N)$.

METHOD AND SYSTEM FOR USING MATERIALIZED VIEWS TO EVALUATE QUERIES INVOLVING AGGREGATION

RELATED APPLICATIONS

This application claims the benefit of U.S. Provisional Application Ser. No. 60/024,635, filed Aug. 27, 1996.

FIELD OF THE INVENTION

The present invention relates to a method and system for using materialized views to compute answers to (evaluate) SQL queries with grouping and aggregation

BACKGROUND OF THE INVENTION

Databases are compilations of information. Useful operations that can be performed on a database include the selection of specific data from the database, and the computation of summary information on all or part of the data in the database. One well known way of specifying operations to be performed on a database is Structured Query Language (SQL). An SQL statement that performs an operation on a database is known as a query.

In large database applications, such as data warehouses and very large transaction recording systems, the size of the database and the volume of incoming data may be very large. Operations on very large databases are time consuming, due to the large amount of data to be processed, and expensive, due to the large quantity of system resources that must be utilized. One solution to this problem is to materialize and maintain appropriately defined aggregation views (summary tables), which are much smaller than the underlying database and can be cached in fast memory.

In globally distributed information systems, the relations may be distributed or replicated, and locating as well as accessing them may be expensive and sometimes not even possible. In mobile computing applications, the relations may be stored on a server and be accessible only via low bandwidth wireless communication, which may additionally become unavailable. Locally cached materialized views of the data, such as results of previous queries, may considerably improve the performance of such applications.

A need arises for an automated technique by which a time consuming and expensive query can be converted or rewritten to form an equivalent query that uses materialized views to compute the answers.

There has been previous work on using views to answer queries (e.g., H. Z. Yang and P. A. Larson, "Query transformation for PSJ queries," In Proc. VLDB, 1987; M. Stonebraker, A. Jhingran, J. Goh, and S. Potamianos, "On rules, procedures, caching and views in database systems", In Proc. ACM SIGMOD, 1990; O. G. Tsatalos, M. H. Solomon, and Y. E. Ioannidis, "The GMAP: A versatile tool for physical data independence", In Proc. VLDB, 1994; C. M. Chen and N. Roussopoulos, "The implementation and performance evaluation of the ADMS query optimizer: Integrating query result caching and matching", In Proc. EDBT, 1994; S. Chaudhuri, R. Krishnamurthy, S. Potarianos, and K. Shim, "Optimizing queries with materialized views", In. Proc. ICDE, 1995; A. Y. Levy, A.O. Mendelzon, Y. Sagiv, and D. Srivastava, "Answering queries using views", In Proc. ACM PODS, 1995], but the problem of finding the equivalent rewritings for SQL queries with multiset semantics, grouping and aggregation, have received little attention.

Caching of previous query results was explored in T. Sellis, "Intelligent caching and indexing techniques for relational database systems", Information Systems, pp. 175–188, 1988, as a means of supporting stored procedures. This corresponds to using materialized views when they match syntactically a sub-expression of the query. In the ADMS optimizer, subquery expressions corresponding to nodes in the query execution (operator) tree were also cached. A cached result was matched against a new query by using common expression analysis. Grouping and aggregation issued were not addressed.

View usability has been studied for conjunctive queries with set semantics and without grouping and aggregation. Levy et al. showed a close condition between the problem of usability of a view in evaluating a query and the problem of query containment. However, this connection does not carry over to the multiset case. Yang et al also presented a simple technique for generating a rewriting of a query Q using view V, under set semantics. Essentially the technique consists of first conjoining V to the FROM clause of Q, and then (independently) minimizing the resulting query to eliminate redundant tables. In the case of SQL queries, however, because of the multiset semantics, the query will not be equivalent after conjoining V to the FROM clause, even if it may be equivalent after removing other tables. Therefore, we need to find a priori which tables in the FROM clause will be replaced by V.

Optimization of conjunctive SQL queries using conjunctive views has been studied in Chaudhuri et al. In addition to considering when such views are usable in evaluating a query, they suggest how to perform this optimization in a cost-based fashion. However, they did not consider the possibility of rewritings that are UNION ALLS of single-block queries.

Recently, the problem of using materialized aggregation views to answer aggregation queries using a purely transformational approach has been considered in A. Gupta, V. Harinarayan, and D. Quass, "Aggregate-query processing in data warehousing environments", Proc. VLDB, 1995. They perform syntactic transformations on the operator tree representation of the query such that the definition of the view would be identical to a sub part of the definition of the query. Additional information of queries involving aggregation have been proposed. The transformational approach is more restrictive than our semantic approach. For example, these techniques would neither determine the usability of view $V_1$ in evaluating query $Q_1$ in Example 1.1, nor the usability of view $V_1'$ in evaluating $Q_1$ in the same example. Also, no formal guarantees of completeness are provided.

A related problem is studied in A. Gupta, I. S. Mumick, and K. A. Ross. "Adapting materialized views after redefinitions", In Proc. ACM SIGMOD, 1995. They assume that a materialized view may be redefined, and investigate how to adapt the materialization of the view to reflect the redefinition. This problem is clearly a special case of the one we study., with the additional assumptions that the system knows the type of modification that took place, that the new view definition is "close" to the old definition, and that the view materialization may be modified.

SUMMARY OF THE INVENTION

The present invention is a method and system for using materialized views to compute answers to SQL queries with grouping and aggregation.

A query is evaluated using a materialized view. The materialized view is semantically analyzed to determine whether the materialized view is usable in evaluating an input query. The semantic analysis includes determining that the materialized view does not project out any columns needed to evaluate the input query and determining that the view does not discard any tuple that satisfies a condition enforced in the input query. If the view is usable, the input query is rewritten to produce an output query that is multiset equivalent to the input query and that specifies one or more occurrences of the materialized view as a source of information to be returned by the output query. The output query is then evaluated.

The semantic analysis and rewriting may be iterated, with the output query of each iteration being the input query of the next iteration. The output query is evaluated after the last iteration.

In one embodiment of the present invention there are a plurality of materialized views. The steps of semantically analyzing and rewriting are iterated at least once for each of the materialized views, with the output query of each iteration being the input query of the next iteration. The evaluating step is performed after the last iteration.

In one embodiment of the present invention, each one of the plurality of materialized views is similar. In another embodiment of the present invention, at least one of the plurality of materialized views is different. In another embodiment of the present invention, each one of the plurality of materialized views is different.

In one embodiment of the present invention, the materialized view does not have aggregation. In another embodiment of the present invention, the materialized view has aggregation.

BRIEF DESCRIPTION OF THE DRAWINGS

The details of the present invention, both as to its structure and operation, can best be understood by referring to the accompanying drawings, in which like reference numbers and designations refer to like elements.

FIG. 1c is an exemplary format of a database table.

FIG. 1d is an exemplary format of another database table.

FIG. 2 is a flow diagram of a process for rewriting a query, according to the present invention, implemented in the system of FIG. 1a.

FIG. 3 is a diagram of usability conditions for a single-block aggregation query without a HAVING clause, a single-block conjunctive view, with a single-block rewritten query.

FIG. 4 is a flow diagram of a rewriting process for a single-block aggregation query without a HAVING Clause, a single-block conjunctive view, with a single-block rewritten query.

FIG. 5 is a diagram of a modification of condition $C_4$ of FIG. 3, when multi-block rewritten queries are permitted.

FIG. 7 is a diagram of a modification of condition $C_3$ of FIG. 3, for a single-block aggregation query with a HAVING clause.

FIG. 9 is a diagram of usability conditions for a single-block aggregation query without a HAVING clause, a single-block aggregation view without a HAVING clause, with a single-block rewritten query.

DETAILED DESCRIPTION OF THE INVENTION

The present invention uses materialized views to compute answers to SQL queries with grouping and aggregation, in the presence of multiset tables. In addition to its obvious potential in query optimization, this problem is important in many applications, such as data warehousing, very large transaction recording systems, global information systems and mobile computing, where access to local or cached materialized views may be cheaper than access to the underlying database. Several conclusions result: First, we show that in the case where the query has grouping and aggregation but the views do not, a view is usable in answering a query only if there is an isomorphism between the view and a portion of the query. Second, when the views also have grouping and aggregation we identify conditions under which the aggregation information present in a view is sufficient to perform the aggregation computations required in the query.

The described procedures for rewriting a query also consider the case in which the rewritten query may be a union of single-block queries. The approach is a semantic one, in that it detects when the information existing in a view is sufficient to answer a query. In contrast, previous work performed syntactic transformations on the query such that the definition of the view would be a sub-part of the definition of the query. Consequently, these prior methods can only detect usages of views in limited cases.

The problem of using materialized SQL views to answer SQL queries is formalized as finding a rewriting of a query Q where the views occur in the FROM clause, and the rewritten query is multiset-equivalent to Q. The technical challenges arise from the multiset semantics of SQL, in conjunction with the use of grouping and aggregation.

We focus on queries and views of the form "SELECT-FROM-WHERE-GROUPBY-HAVING", i.e., single-block queries, where the SELECT and HAVING clauses may contain the SQL aggregate functions MIN, MAX, SUM and COUNT. The SQL aggregate functions SUM, COUNT and AVG are related in that, given values for two of them over some column, the third can be computed. Dealing with AVG is consequently straightforward, but complicates the presentation. Hence, AVG is not considered. The availability of any meta-information about the schema, such as keys or functional dependencies, is not assumed.

Figure 1A:
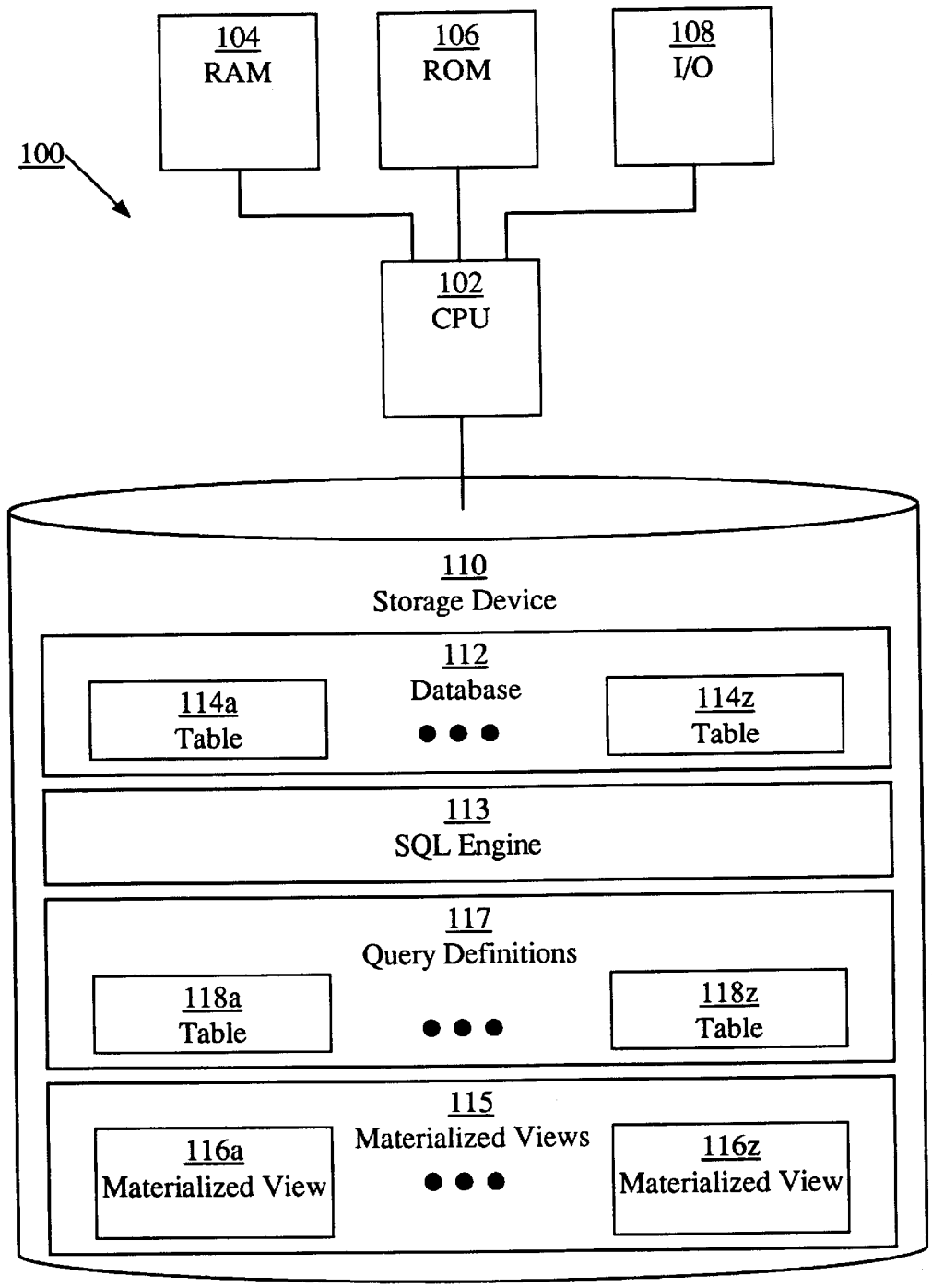
FIG. 1a is a block diagram of an exemplary database system with materialized views.

An exemplary database system 100 is shown in FIG. 1a. System 100 includes central processing unit (CPU) 102, which is connected to random access memory (RAM) 104, read-only memory (ROM) 106, input/output devices (I/O) 108 and storage device 110. CPU 102 may comprise a microprocessor, for example, an INTEL PENTIUM processor, or CPU 102 may comprise a minicomputer or mainframe processor. RAM 104 and ROM 106 store program instructions that are executed by CPU 102 and data that is used during program execution. I/O devices 108 may include any devices used to input data to system 100, such as a keyboard, mouse, trackpad, trackball and graphics tablet, to output data from system 100, such as a display and a printer, and to both input and output data, such as a modem and a network adapter. Storage device 110, which stores data that is used by the present invention, may comprise, for example, a magnetic disk and/or optical disk and may also comprise a magnetic tape.

Storage device 110 includes database 112, which is typically stored as one or more files. Database 112 includes one or more tables 114a–z, which are compilations of information. Generally, tables are conceptualized as being organized in rows and columns, although the storage format may be different. Query definitions 117 includes one or more queries 118a–z, which are specifications of operations that are to be performed on one or more tables 114 in database 112 or on one or more materialized views 116. Queries are typically written using SQL. Materialized views 115 includes one or more materialized views 116a–z, each of which is the result of a query that has been performed. Each view is a compilation of information, similar in structure to a table. A view that has been stored is usable, like a table, as an input to a query. Such a view is termed a materialized view. A query may therefore be performed on one or more materialized views, or on a combination of materialized views and tables. SQL Engine 113 is a software module that performs the operations specified by the queries and generates the views.

Figure 1B:
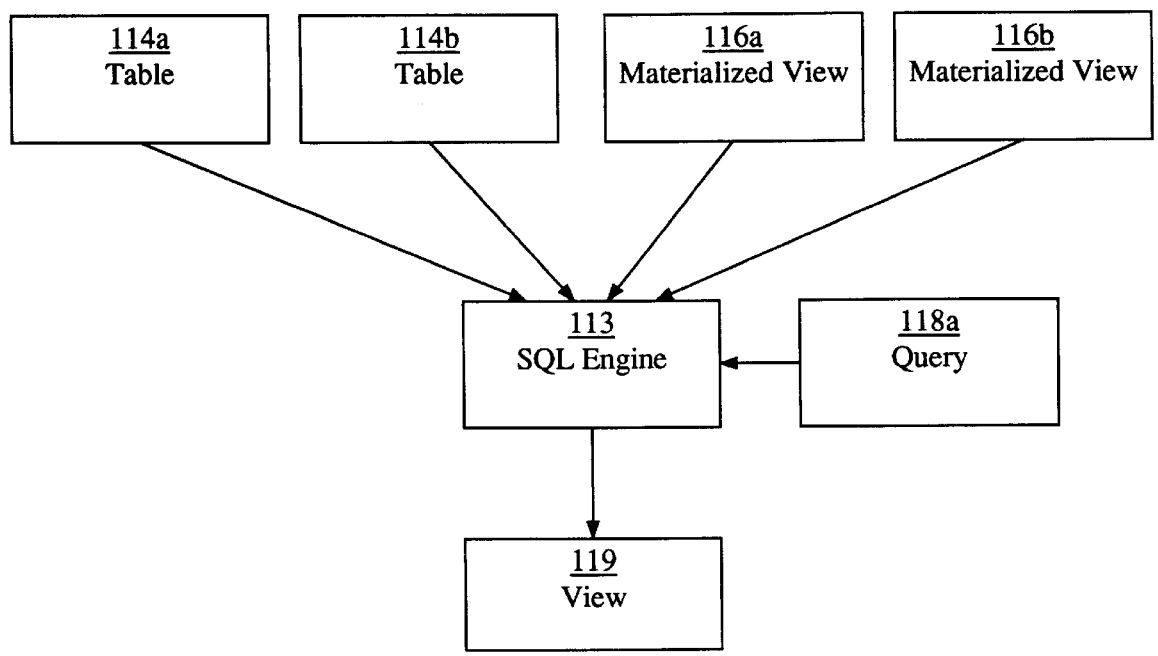
FIG. 1b is a block diagram of relationship among tables, queries and views.

The relationship among tables, queries and views is shown in FIG. 1b. Query 118a is a specification of an operation that selects data from one or more tables, such as 114a and 114b, and/or views, such as 116a and 116b, and of operations to be performed on the selected data, such as finding the largest value (MAX), the smallest value (MIN), the sum of the selected data (SUM), the average of the selected data (AVG), etc. The query 118a and the tables 114a and 114b and views 116a and 116b that are specified by the query are input to SQL engine 113, which evaluates the query to generate the resulting view 119. The result of a query represents a particular way of looking at the data in the input tables and/or views, thus, the result of a query is termed a view 119.

An example of a database having two tables, and several queries and their resulting views, is described below. This example is illustrative only; the present invention is in no way limited to the described example.

EXAMPLE 1

Consider a data warehouse that holds information useful to a telephone company. The database maintains the following tables:

Customer(Phone_Number, Cust_Name) table 120, shown in FIG. 1c, maintains information about individual customers of the telephone company. Customer table 120 includes a plurality of rows, such as rows 123a–b. Each row corresponds to one data record, including one or more data fields. The data fields are organized into two columns, Phone_Number column 121 and Cust_Name column 122. Each column corresponds to a particular piece of data that is included in each data record. Thus, each row in Customer table 120 has, in its Phone_Number column 121, the phone number corresponding to the customer named in the Cust_Name column 122.

Likewise, Calls(From, To, Time, Day, Month, Year, Duration, Plan_Id, Charge) table 130, shown in FIG. 1d, which maintains information about each individual call includes a plurality of rows, such as rows 140a–b and nine columns 131–139. Column 131, From, contains the phone number from which the call was placed. Column 132, To, contains the phone number to which the call was placed. Column 133, Time, contains the time at which the call was placed. Column 134, Day, contains the day on which the call was placed. Column 135, Month, contains the month in which the call was placed. Column 136, Year, contains the year in which the call was placed. Column 137, Duration, contains the duration of the call. Column 138, Plan_Id, contains an identifier of the calling plan applicable to the call. Column 139, Charge, contains the charge for the call.

Assuming that the telephone company is interested in determining calling plans that have earned more than a million dollars in one of the years between 1990 and 1995. The following SQL query $Q_1$ may be used for this purpose:

| $Q_1$: | SELECT | Year, Plan_Name, SUM(Charge) |
|---|---|---|
| | FROM | Calls, Calling_Plans |
| | WHERE | Calls.Plan_Id = Calling_Plans.Plan_Id |
| | | AND Year $\geq$ 1990 AND Year $\leq$ 1995 |
| | GROUPBY | Year, Plan_Name |
| | HAVING | SUM(Charge) > 1,000,000 |

The telephone company also maintains materialized views that summarize the performance of each of their calling plans on a periodical basis. In particular assume that the following materialized view $V_1$(Plan_Id,Month,Year, Earnings) is available:

| $V_1$: | SELECT | Plan-ID, Month, Year, SUM(Charge) |
|---|---|---|
| | FROM | Calls |
| | GROUPBY | Plan_Id, Month, Year |

View $V_1$ can be used to evaluate the query $Q_1$ by joining $V_1$ with the table Calling_Plans, collapsing multiple groups corresponding to the monthly plan earnings into annual plan earnings, and enforcing the additional conditions to get the summaries of plans earning more than a million dollars in one of the years between 1990 and 1995. The rewritten query $Q_1$ that uses $V_1$ is:

| $Q_1'$: | SELECT | Year, Plan_Name, SUM(Earnings) |
|---|---|---|
| | FROM | $V_1$, Calling_Plans |
| | WHERE | $V_1$.Plan_Id = Calling_Plans.Plan_Id |
| | | AND Year $\geq$ 1990 AND Year $\leq$ 1995 |
| | GROUPBY | Year, Plan_Name |
| | HAVING | SUM(Earnings) > 1,000,000 |

The Calls table may be huge, and the materialized view $V_1$ is likely to be orders of magnitude smaller than the Calls table. Hence, evaluating $Q_1$ will be much faster than evaluating $Q_1$, emphasizing the importance of recognizing that $Q_1$ can be rewritten to use the materialized view $V_1$.

Consider now the case where, instead of $V_1$, the telephone company maintains the materialized view $V_1$(Plan-Id, Month, Year, Earnings), summarizing the performance of their calling plans only since 1991:

| $V_1'$: | SELECT | Plan-ID, Month, Year, SUM(Charge) |
|---|---|---|
| | FROM | Calls |
| | WHERE | Year $\geq$ 1991 |
| | GROUPBY | Plan_Id, Month, Year |

View $V_1$ can still be used to evaluate query $Q_1$, However, not all the table in $Q_1$ can be computed using $V_1'$: the summary information computation for 1990 would have to access the Calls table, and the rewritten query $Q_1''$: involves a UNION ALL.

| | | |
|---|---|---|
| $Q_1''$: | SELECT | Year, Plan_Name, SUM(Earnings) |
| | FROM | $V_1'$, Calling_Plans |
| | WHERE | $V_1'$.Plan_Id = Calling_Plans.Plan_Id |
| | | AND Year ≤ 1995 |
| | GROUPBY | Year, Plan_Name |
| | HAVING | SUM(Earnings) > 1,000,000 |
| | UNION ALL | |
| | SELECT | Year, Plan_Name, SUM(Charge) |
| | FROM | Calls, Calling_Plans |
| | WHERE | Calls.Plan_Id = Calling_Plans.Plan_Id |
| | | AND Year = 1990 |
| | GROUPBY | Year, Plan_Name |
| | HAVING | SUM(Charge) > 1,000,000 |

Evaluating $Q_1''$ will still be faster than evaluating $Q_1$, even though it involves accessing the Calls table.

A process for rewriting a query is shown in FIG. 2. The process begins with step 202, in which the original query, which is to be rewritten, and the views that are to be used, are provided. One view is selected to be analyzed first. In step 204, the view is semantically analyzed to determine whether it is usable in evaluating the original query. The semantic analysis involves two parts. First, the view is analyzed to determine whether the view projects out any needed columns. Second, the view is analyzed to determine whether the view discards any tuples that satisfy a condition enforced in the original query. If a view V is usable in evaluating a query Q, then V must "replace" some of the tables and conditions enforced in Q: other tables and conditions from Q must remain in the rewritten query Q'. The rewritten query Q' can be a single-block query, or a multi-block query that is a UNION ALL of single-block queries. For view V to be usable in answering query Q, such that Q' is a single-block query, it must be the case that:

V does not project out any columns needed by Q.

A column A is needed by Q if it appears in the result of Q or if Q needs to enforce a condition involving A that has not been enforced in the computation of V.

V does not discard any tuples needed by Q.

A tuple is needed by Q if it satisfies the conditions enforced in Q.

When Q' can be a multi-block query, the second requirement can be somewhat relaxed to require that V not discard any tuples needed for some of the groups in Q.

In step 206, it is determined whether the view is usable, based on the results of step 204. If the view is not usable, then in step 214, the next view from among those provided is selected to be analyzed. If the view is usable, then in step 208, the query is rewritten to form a multi-set equivalent query that uses the view. In step 210, it is determined whether the iteration of the selected view is complete. If it is not, then the process loops back to step 204, in which the rewritten query is semantically analyzed. As long as the view remains usable, a rewritten query is generated for each iteration. If the iteration is complete, then in step 212, it is determined whether all provided views have been analyzed. If not, then in step 214, the next provided view is selected. The process then loops back to step 204 and the newly selected view is iteratively analyzed using the current rewritten query. If, in step 212, all provided views have been analyzed, then in step 216, the final rewritten query that results from the process is evaluated.

NOTATION AND DEFINITIONS

We consider SQL queries and views with grouping and aggregation. Queries can either be single-block queries (described below) or union multi-block queries that are the UNION ALL (i.e., additive multiset union) of single-block queries. A view is defined by a query, and the name of the view is associated with the result of the query. In this document, we consider only views defined by single-block queries. We give the form as well as a simple example of a single-block query below:

| | | |
|---|---|---|
| Q: | SELECT | Sel(Q) |
| | FROM | $R_1(\bar{A}_1), \ldots, R_n(\bar{A}_n)$ |
| | WHERE | Conds(Q) |
| | GROUPBY | Groups(Q) |
| | HAVING | GConds(Q) |
| Qe: | SELECT | A, MAX(D), SUM(E) |
| | FROM | R(A, B), S(C, D, E) |
| | WHERE | B = C |
| | GROUPBY | A, B |
| | HAVING | SUM(D) > 1000 |

For notational convenience, we modify the naming convention of standard SQL to guarantee unique column names for each of the columns in a single-block query. For example, let $R_1$ and $R_2$ be two tables each with a single column named A. If a single-block query Q has both $R_1$ and $R_2$ in its FROM clause, our notation would replace them by $R_1(A_1)$ and $R_2(A_2)$. Every reference to $R_1.A$ in Q is replaced by $A_1$, and every reference to $R_2.A$ in Q is replaced by $A_2$. Similarly, if a single-block query Q has two range variables $R_1$ and $R_2$ ranging over table R in its FROM clause, our notation would replace them by $R(A_1)$ and $R(A_2)$. Every reference to $R_1.A$ in Q is replaced by $A_1$, and every reference to $R_2.A$ in Q is replaced by $A_2$.

We use Tables(Q) to denote the set of tables (along with their columns) $\{R_1(\bar{A}_1), \ldots, R_n(\bar{A}_n)\}$ in the FROM clause of a single-block query Q, and Cols(Q) to denote $\bar{A}_1 \cup \ldots \cup \bar{A}_n$, i.e., the set of columns of tables in Tables(Q). In the example of query $Q_e$, Tables($Q_e$) is $\{R(A,B),S(C,D,E)\}$ and Cols($Q_e$) is $\{A,B,C,D,E\}$.

The set of columns in the SELECT clause of Q, denoted by Sel(Q), consists of: (a) non-aggregation columns: this is a subset of the columns in Cols(Q): and is denoted by ColSel(Q); and (b) aggregation columns: these are of the form AGG(Y), where Y is in Cols(Q) and AGG is one of the aggregate functions MIN, MAX, SUM and COUNT. The set of columns that are aggregated upon, such as Y above, is a subset of Cols(Q), and is denoted by AggSel(Q). In the example of query $Q_e$, Sel($Q_e$) is $\{A,MAX(D),SUM(E)\}$, ColSel($Q_e$) is $\{A\}$ and AggSel($Q_e$) is $\{D,E\}$.

The grouping columns of query Q, denoted by Groups(Q), consists of a subset of the columns in Cols(Q). SQL requires that if Groups(Q) is not empty, then ColSel(Q) must be a subset of Groups(Q). In the example of query $Q_e$, Groups ($Q_e$) is $\{A,B\}$ and ColSel($Q_e$) is a proper subset of Groups ($Q_e$).

We consider built-in predicates that are arithmetic predicates of the form α op β, where op is one of the comparison predicates $\{<, \leq, =, \geq, >\}$, and α and β are terms formed from columns of tables, aggregation columns, and constants using the arithmetic operations +, - and *.

The conditions in the WHERE clause of query Q, denoted by Conds(Q), consists of a Boolean combination of built-in predicates formed using columns in Cols(Q) and constants. The conditions in the HAVING clause of query Q, denoted by GConds(Q), consists of a Boolean combination of built-in predicates formed using columns in Groups(Q), aggregation columns of the form AGG(Y) where Y is in Cols(Q), and constants. In the example of query $Q_e$, Conds($Q_e$) is B=C, and GConds($Q_e$) is SUM(D)>1000.

Given a single-block query Q, if Groups(Q), AggSel(Q) and GConds(Q) are non-empty (Note that each of Groups (Q), AggSel(Q) and GConds(Q) can be empty without the other two being empty.), then Q is referred to as an aggregation query.

Determining that a single-block view V is usable in evaluating a single-block query requires (as we show later in the paper) that we consider mappings from V to Q. These are specified by column mappings, defined below.

Column Mappings

A column mapping from a single-block query $Q_a$ to a single-block query $Q_b$ is a mapping $\phi$ from $Cols(Q_a)$ to $Cols(Q_b)$ such that if $R(A_1, \ldots, A_n)$ is a table in $Tables(Q_a)$, then: (1) there exists a table $R(B_1, \ldots, B_n)$ in $Tables(Q_b)$, and (2) $B_i = \phi(A_i), 1 \leq i \leq n$.

A 1-1 column mapping $\phi$ is a column mapping from $Q_a$ to $Q_b$ such that distinct columns in $Cols(Q_a)$ are mapped to distinct columns in $Cols(Q_b)$. Otherwise, the column mapping is a many-to-1 column mapping.

As a shorthand, if R is a table in $Tables(Q_a)$, we use $\phi(R(A_1, \ldots, A_n))$ to denote $R(\phi(A_1), \ldots, \phi(A_n))$, where $A_1, \ldots, A_n$ are columns in $Cols(Q_a)$. We use similar shorthand notation for mapping query results, sets and lists of columns, sets of tables, and conditions.

We formalize the intuitive notation of "usability" of view V in evaluating query Q as finding a rewriting of Q, defined below. In this paper, we consider only rewritings that are either single-block queries or multi-block queries that are UNION ALLS of single-block queries. For example, rewriting $Q_1'$ in Example 1.1 is a single block query, whereas rewriting $Q_1''$ in the same example is a multi-block query that is a UNION ALL of single-block queries.

Rewriting of a Query

A query Q' is a rewriting of query Q that uses view V if: (1) Q and Q' are multiset-equivalent, i.e., they compute the same multiset of answers for any given database, and (2) Q' contains one or more occurrences of V in the FROM clause of one of its blocks.

In the sequel, we say that view V is usable in evaluating query Q, if there exists a single-block or a union multi-block query Q' such that Q' is a rewriting of Q that uses V.

When the rewritten query can be a multi-block query, there is a certain trivial sense in which any view V is usable in evaluating a given query Q—the rewritten query can be the UNION ALL of Q itself and a single-block query in which V occurs in the FROM clause and which has an unsatisfiable conjunction of built-in predicates in the WHERE clause. Further, when Q is unsatisfiable, any rewriting of Q would also have to be unsatisfiable. Dealing with these and other such possibilities would complicate our presentation without aiding our understanding of the problem. Hence, we consider satisfiable queries and views, and do not permit multi-block rewritings where any block is unsatisfiable.

AGGREGATION QUERY AND CONJUNCTIVE VIEWS

In this section we consider the problem of using single-block conjunctive views to evaluate a single-block query with grouping and aggregation. Using a single-block view to evaluate a multi-block query can be achieved by independently testing usability of the view in evaluating each block of the multi-block query separately.

We formalize these intuitions below, show that they yield both necessary and sufficient conditions for certain kinds of queries, and present an algorithm to rewrite Q using V. We first examine the case when the query does not have a HAVING clause, and then describe the effect of the HAVING clause on the conditions for usability and the rewriting algorithms

Aggregation Query Without A HAVING Clause

Single-block Rewritten Query

The conditions for usability of a single-block view V in evaluating a single-block query Q, such that the rewritten query Q' is a single-block query, are presented formally in FIG. 3 in terms of column mappings. Note that the conditions apply also to the restricted case when both the view and the query are conjunctive.

Condition $C_1$ 302 and the first part of condition $C_4$ 308 essentially guarantee that the view is multiset equivalent to its image under $\phi$: these are a reformulation of the conditions presented in S. Chaudhuri and M. Y. Vardi, "Optimization of real conjunctive queries", In *Proc. ACM PODS*, 1993 for testing equivalence of conjunctive queries under the multiset semantics. Note that the 1-1 mapping is necessary because of the multiset semantics, whereas a many-to-1 mapping would suffice in the case of sets. Condition $C_4$ 308 ensures that constraints not enforced in the view can still be enforced in the query when the view is used, since they do not refer to columns that are projected out in the view and hence are no longer available. Conditions $C_2$ 304 and $C_3$ 306 ensure that the view does not project out any columns that are required in the SELECT clause of the query.

If conditions $C_1$–$C_4$ 302–308 are satisfied, the rewritten query Q' is obtained from Q by applying process ConjViewSingleBlock 400, shown in FIG. 4. Process 400 begins with step $S_1$ 402, in which all the tables in $\phi(Tables(V))$ are replaced by $\phi(V)$. In step $S_2$ 404, each column A in Groups (Q) ∪ ColSel(Q) ∪ AggSel(Q) are replaced by $\phi(B_A)$, where $B_A$ satisfies conditions $C_2$ 304 and $C_3$ 306, part 1. In step $S_2$ 404–406, a Boolean combination of built-in predicates Conds' satisfying condition $C_4$ 308 is determined. Conds(Q) in Q is then replaced by Conds'. In step $S_4$ 408, COUNT(A) is replaced by COUNT(B), where B is any column in $\phi(V)$. COUNT(A) is an aggregation column in Sel(Q) such that A is in $\phi(Cols(V))$, but not in $\phi(Sel(V))$.

Theorem 3.1

Let Q be a single-block aggregation query without a HAVING Clause, and let V be a single-block conjunctive view.

If conditions $C_1$–$C_4$ are satisfied, V is usable in evaluating Q. In that case Q', obtained by applying algorithm ConjViewSingleBlock is a rewriting of Q using V.

If Conds(Q) and Conds(V) contain only equality predicates of the form A=B, where A and B are column names or constants, and the rewritten query is required to be a single-block query, V is usable in evaluating Q only if conditions $C_1$–$C_4$ are satisfied.

The following example illustrates conditions $C_1$–$C_4$ 302–308 and process ConjViewSingleBlock 400 for obtaining a single-block rewritten query.

EXAMPLE 2

Consider the telephone company database from Example 1. The following query $Q_2$ can be used to determine the total earnings of each calling plan as well as the total number of calls charged under each calling plan in December 1995.

```
Q₂:   SELECT    PN₁, SUM(C₁), COUNT(C₁)
      FROM      Calls(F₁, T₁, TI₁, D₁, M₁, Y₁, DU₁, P₁, C₁),
                Calling_Plans(PI₁, PN₁)
      WHERE     P₁ = PI₁ AND Y₁ = 1995 AND M₁ = 12
      GROUPBY   PN₁
```

Assume that the telephone company maintains call data for December 1995 as the view $V_2$ below:

```
V₂:   SELECT    F₂, T₂, TI₂, D₂, M₂, Y₂, DU₂, P₂, C₂
      FROM      Calls (F₂, T₂, TI₂, D₂, M₂, Y₂, DU₂, P₂, C₂)
      WHERE     Y₂ = 1995 and M₂ = 12
```

View $V_2$ can be used to evaluate query $Q_2$ since conditions $C_1$–$C_4$ are satisfied: ($C_1$) The 1-1 column mapping $\phi$ from $V_2$ to $Q_2$ is $\{F_2 \rightarrow F_1, T_2 \rightarrow T_1, TI_2 \rightarrow TI_1, D_2 \rightarrow D_1, M_2 \rightarrow M_1, Y_2 \rightarrow Y_1, DU_2 \rightarrow DU_1, P_2 \rightarrow P_1, C_2 \rightarrow C_1\}$. ($C_2$) Trivially satisfied. ($C_3$) For column $C_1$, $B_{C_1}$ is the column $C_2$ in Sel($V_2$). ($C_4$) Conds' is given by $P_1=PI_1$.

The single-block rewriting of $Q_2$ that uses $V_2$ is:

```
Q₂'   SELECT    PN₁, SUM(C₁), COUNT(C₁)
      FROM      V₂(F₁, T₁, TI₁, D₁, M₁, Y₁, DU₁, P₁, C₁),
                Calling_Plans(PI₁, PN₁)
      WHERE     P₁ = PI₁
      GROUPBY   PN₁
```

Multi-Block Rewritten Query

When the rewritten query is not required to be a single-block query, but can be a multi-block query that is a UNION ALL of single-block queries, additional usage of views in evaluating queries are possible.

The conditions for usability of a single-block view V in evaluating a single-block query Q, when Q' can be a multi-block rewritten query, are similar to the conditions for usability when Q' has to be a single-block query. In particular conditions $C_1$–$C_3$ 302–306 are unchanged. Condition $C_4$ 308 has to be modified to reflect the possibility that V can be used to compute only some of the tuples of Q. The modified condition $C_4^m$ 500 is formally presented in FIG. 5.

Intuitively, given a view V that satisfied condition $C_1$ 302 query Q can always be reformulated as a UNION ALL of 2 single-block queries $Q_a$ and $Q_b$, that differ from Q (and from each other) only in their WHERE clauses such that (1) Conds($Q_a$) is equivalent to Conds(Q) & $\phi$(Conds(V)), and (2) Conds($Q_b$) is equivalent to Conds(Q) & $\neg\phi$(Conds(V)).

Figure 6:
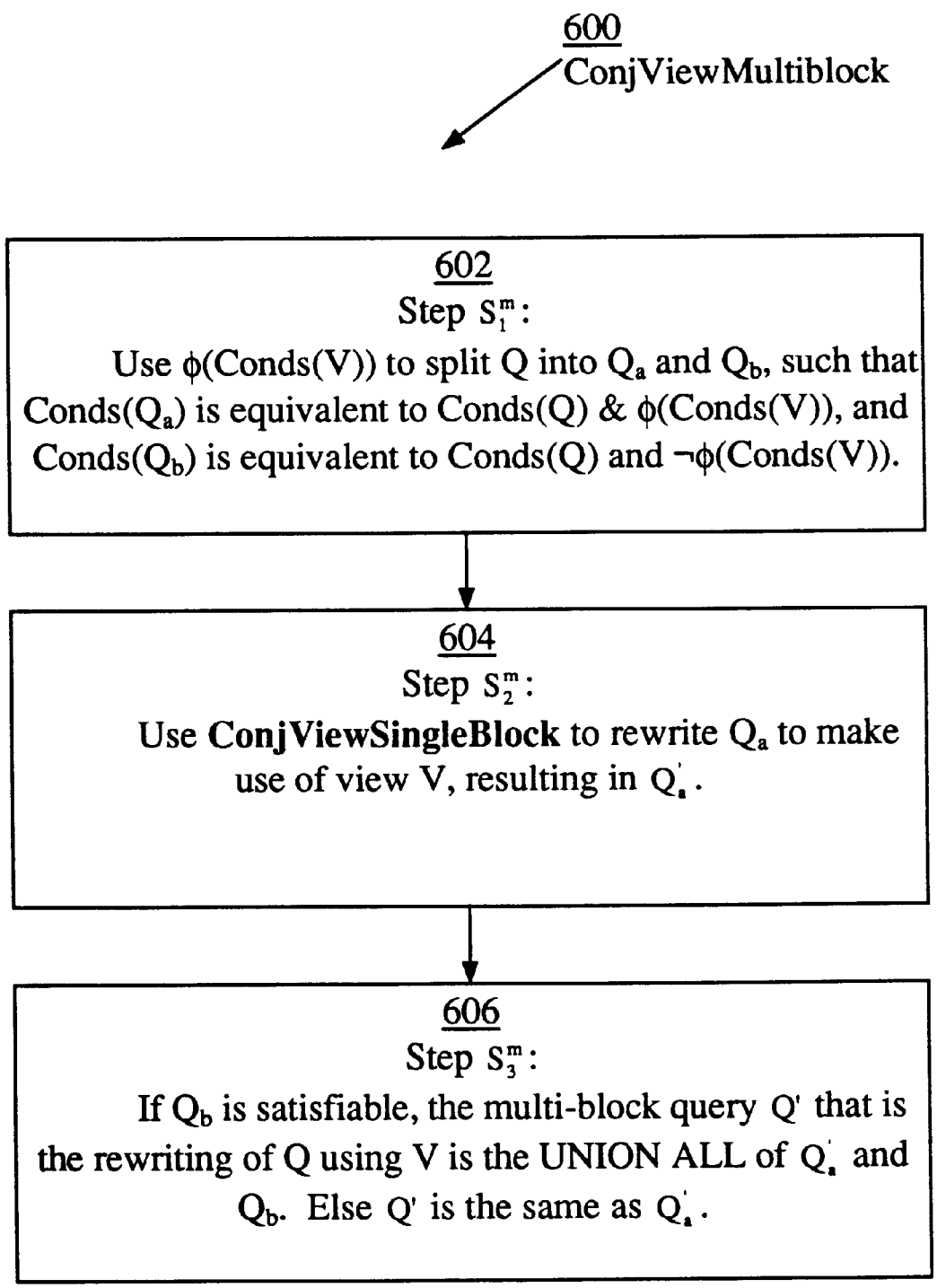
FIG. 6 is a flow diagram of a rewriting process for a single-block aggregation query without a HAVING clause, a single-block conjunctive view, with a multi-block rewritten query.

View V can be potentially used to evaluate $Q_a$, but clearly not $Q_b$. Conditions $C_1$–$C_3$, 302–306 and parts 1, 2(*a*) and 2(*b*) of condition $C_4^m$ 500 essentially check whether view V can be used to evaluate $Q_a$. The reformulation of Q as the UNION ALL of $Q_a$ and $Q_b$, however, does not always preserve the semantics of Q. To preserve the semantics, it must be guaranteed that $Q_a$ and $Q_b$ do not compute tuples for the same group of Q—part 2(*c*) of condition $C_4^m$ 500 embodies this requirement. If conditions $C_1$–$C_3$ 302–306 and $C_4^m$ 500 are satisfied, the multi-block rewritten query Q' is obtained, using process ConjViewMultiBlock 600, shown in FIG. 6.

Process 600 begins with step 602, in which $\phi$(Conds(V)) is used to split Q into $Q_a$ and $Q_b$, such that Conds($Q_a$) is equivalent to Conds(Q) & $\phi$(Conds(V)), and Conds($Q_b$) is equivalent to Conds(Q) and $\neg\phi$(Conds(V)). In step 604, process ConjViewSingleBlock is used to rewrite $Q_a$ to make use of view V, resulting in the single-block query $Q'_a$. In step 606, if $Q_b$ is satisfiable, the multi-block query Q' that is the rewriting of Q using V is the UNION ALL of $Q'_a$ and $Q_b$. Else Q' is the same as $Q'_a$.

Theorem 3.2

Let Q be a single-block aggregation query without a HAVING clause, and let V be a single-block conjunctive view.

If conditions $C_1$–$C_3$ and $C_4^m$ are satisfied, V is usable in evaluating Q. In that case Q', obtained by applying algorithm ConjViewMuliBlock, is a multi-block rewriting of Q using V.

Multiple Uses of Views

Often a query can make use of multiple views, or the same view multiple times. The rewriting algorithms ConjViewSingleBlock and ConjViewMultiBlock presented above can be used to incorporate multiple uses of views. To obtain rewritings with multiple views we create successive rewritings $Q'_a, \ldots, Q'_n$, where each rewriting is obtained from the previous one by testing conditions $C_1$–$C_3$ 302–306 and either $C_4$ 308 or $C_4^m$ 500 (depending on the form of the rewriting desired), and applying the corresponding rewriting algorithm. At each successive rewriting, the views incorporated in previous rewritings are treated as database tables rather than being expanded using their view definitions.

Theorem 3.3

Let Q be a single-block aggregation query without a HAVING clause, and let $V_a, \ldots V_m$ be single-block conjunctive views. Then the following hold:

1. An iterative application of algorithm ConjViewSingleBlock is sound, i.e., each successive rewriting is multiset-equivalent to Q.
2. An iterative application of algorithm ConjViewMuldiBlock is sound, i.e., each successive rewriting is multiset-equivalent to Q.
3. The rewriting algorithm ConjViewSingleBlock is order-independent. That is, if there is a single-block rewriting of Q that uses each of $V_a, \ldots V_m$ then the result of rewriting Q to incorporate views $V_a, \ldots V_m$, would be the same regardless of the order in which the views are considered.
4. If Conds(Q), Conds($V_a$), …, Conds($V_m$) contain only equality predicates of the form A=B, where A and B are column names, or constants, and the rewritten query is required to be a single-block query, then the iterative application of algorithm ConjViewSingleBlock is complete. That is, any rewriting of Q that uses one or more of $V_a, \ldots, V_m$ can be obtained by iteratively applying algorithm ConjyiewSingleBlock.

It is important to note that, for the case of equality predicates, the iterative application of ConjViewSingleBlock guarantees that we find all ways of using the views to answer a query, provided the rewritten query is required to be a single-block query.

AGGREGATION QUERY WITH A HAVING CLAUSE

We now describe how to extend the previous algorithms to the case in which the queries may contain a HAVING clause. We only consider the case when the rewritten query is required to be a single-block query. The case when the rewritten query can be a multi-block query is a straightforward extension, along the lines described for aggregation queries without HAVING clauses. We first describe how to extend our usability conditions to accommodate the HAVING clause, and then show how we can use various transformations on the query that can cause the conditions to be satisfied in a larger number of cases.

Intuitively, when the single-block query Q has a HAVING clause, the conditions for usability of a conjunctive view V in evaluating Q and the rewriting algorithm ConjViewSingleBlock need to be extended to account for:

Conditions in GConds(Q) that must be satisfied by the query, in addition to conditions in Conds(Q), and Aggregation columns of the form AGG(Y), that occur in GConds(Q), but not in Sel(Q).

Figure 8:
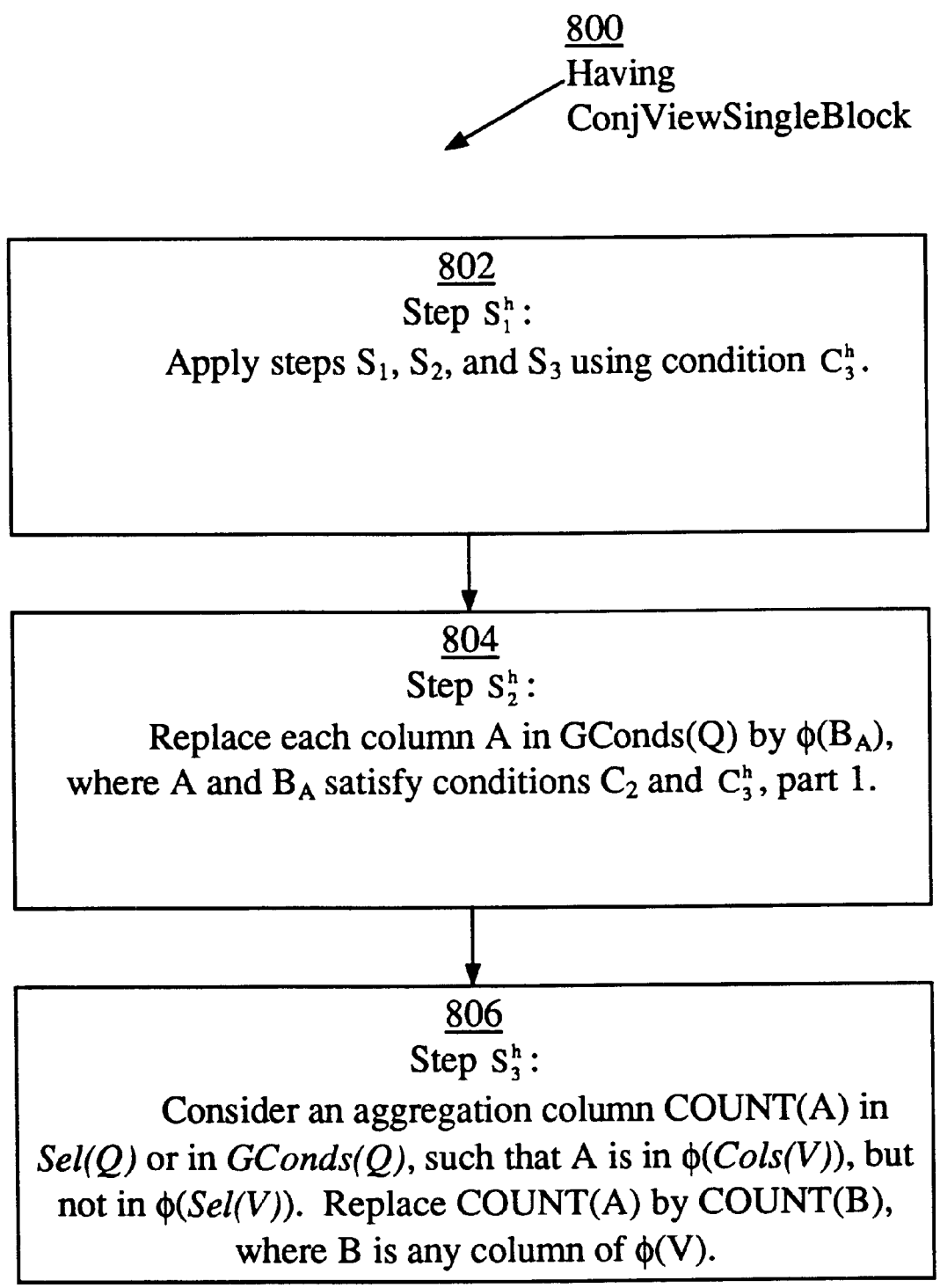
FIG. 8 is a flow diagram of a rewriting process for a single-block aggregation query with a HAVING clause, a single-block conjunctive view, with a single-block rewritten query.

To accommodate such conditions we modify $C_3$ 306 to also consider Ad arguments that appear in GConds(Q). The extended condition, $C_3^h$ 700, is formally presented in FIG. 7. If Q and V satisfy conditions $C_1$ 302, $C_2$ 304, $C_3^h$ 700 and $C_4$ 308, the single-block rewritten query Q' is obtained using the algorithm HavingConjViewSingleBlock, comprising steps 802, 804 and 806, presented in FIG. 8.

Theorem 3.4

Let Q be a single-block aggregation query with a HAVING clause, and let V be a single-block conjunctive view.

If conditions $C_1$, $C_2$, $C_3^h$ and $C_4$ are satisfied, V is usable in evaluating Q. In that case Q', obtained by applying algorithm HavingConjViewSingleBlock, is a rewriting of Q using V.

Strengthening the Conditions in the Query

When query Q has a HAVING clause, the conditions in its HAVING clause may enable us to strengthen the conditions in the WHERE clause, without affecting the result of the query. Strengthening the conditions in the WHERE clause may allow us to detect usability of views that would otherwise not be determined to be usable, because it makes it more likely that condition $C_4$ 308 will be satisfied.

Several authors have considered the problem of inferring conditions that can be conjoined to Conds(Q) given the conditions in GConds(Q), and removing redundant conditions in GConds(Q). These techniques can be applied to rewrite the query Q as a pre processing step, yielding possibly modified conditions Conds(Q) and GConds(Q). The modified Conds(Q) and GConds(Q) are then used in checking conditions $C_2$ 304, $C_3^h$ 700, and $C_4$ 308.

EXAMPLE 3

Consider again the telephone company database from Example 1.1. The following query $Q_3$ can be used to determine, for each customer, the maximum charge for a single call under the calling plan "TrueUniverse" in December 1995, provided the charge exceeds $10.

| $Q_3$: | SELECT | $F_1$, MAX($C_1$) |
|---|---|---|
| | FROM | Calls($F_1$, $T_1$, $TI_1$, $D_1$, $M_1$, $Y_1$, $DU_1$, $P_1$, $C_1$), |
| | | Calling_Plans($PI_1$, $PN_1$) |
| | WHERE | $P_1$ = $PI_1$ AND $PN_1$ = "TrueUniverse" |
| | | AND $Y_1$ = 1995 AND $M_1$ = 12 |
| | GROUPBY | $F_1$ |
| | HAVING | MAX($C_1$) > 10 |

Assume that the telephone company maintains detailed call data for 1995, for calls whose charge exceeds $1, as the view $V_3$ below:

| $V_3$: | SELECT | $F_2$, $T_2$, $TI_2$, $D_2$, $M_2$, $Y_2$, $DU_2$, $P_2$, $C_2$ |
|---|---|---|
| | FROM | Calls($F_2$, $T_2$, $TI_2$, $D_2$, $M_2$, $Y_2$, $DU_2$, $P_2$, $C_2$) |
| | WHERE | $Y_2$ = 1995 AND $C_2$ > 1 |

Although the WHERE clause of $Q_3$ does not enforce any conditions on the Charge column, while the WHERE clause of $V_3$ does, $V_3$ can still be used to evaluate $Q_3$. This is because the condition MAX($C_1$)>10 in the HAVING clause of $Q_3$ is equivalent to having the condition $C_1$>10 in the WHERE clause of $Q_3$. Strengthening. Conds($Q_3$) by conjoining $C_1$>10 (and subsequently removing the redundant HAVING clause) allows the detection of usability of $V_3$ in evaluating $Q_3$. The rewriting of $Q_3$ that uses $V_3$ is:

| $Q_3'$: | SELECT | $F_1$, MAX($C_1$) |
|---|---|---|
| | FROM | $V_3$($F_1$, $T_1$, $TI_1$, $D_1$, $M_1$, $Y_1$, $DU_1$, $P_1$, $C_1$), |
| | | Calling_Plans($PI_1$, $PN_1$) |
| | WHERE | $P_1$ = $PI_1$ AND $PN_1$ = "TrueUniverse" |
| | | AND $M_1$ = 12 AND $C_1$ > 10 |
| | GROUPBY | $F_1$ |

Note that view $V_3$ cannot be used to answer query $Q_2$ (from Example 3.1) since conditions $C_4$ 308 and $C_4^m$ 500 are violated—in particular $V_3$ enforces the condition $C_2$ 304>1, which results in the discarding of Calls tuples needed by $Q_2$.

AGGREGATION QUERY AND VIEWS

In this section we consider the problem of using single-block views in evaluating single-block queries when both the view and the query have grouping and aggregation. We only consider the case when the rewritten query is required to be a single-block query.

Recall that the two intuitive requirements for the usability of a conjunctive view V in answering a single-block aggregation query Q are that V not project out columns needed in Q, and that V not discard tuples needed in Q. In the presence of grouping and aggregation in the view, these requirements become more subtle:

An aggregation over a column in V can be thought of as though that column was partially projected out, since V contains just aggregate values over that column, not the original column values themselves.

A GROUPBY in V results in the multiplicities of the tuples being lost.

However, as the following examples illustrate, in some cases it is possible to overcome the difficulties introduced by grouping and aggregation in the view.

EXAMPLE 4

Coalescing Subgroups

The following example illustrates that the aggregate information in a view may be sufficient to compute the aggregate information needed in the query.

Consider the telephone company database from Example 1. The following query $Q_4$ can be used to determine the total earnings of various calling plans as well as the maximum charge under each calling plan in 1995.

```
Q_4:  SELECT    P_1, PN_1 SUM(C_1), MAX(C_1)
      FROM      Calls(F_1, T_1, TI_1, D_1, M_1, Y_1, DU_1, P_1, C_1),
                Calling_Plans(PI_1, PN_1)
      WHERE     P_1 = PI_1 AND Y_1 = 1995
      GROUPBY   P_1, PN_1
```

Assume that the telephone company also maintains information giving the total earnings as well as the maximum charge of each calling plan in each month in the form of view $V_4$ below:

```
V_4:  SELECT    P_2, M2, Y2 SUM(C_2), MAX(C_2)
      FROM      Calls(F_2, T_2, TI_2, D_2, M_2, Y_2, DU_2, P_2, C_2),
      GROUPBY   P_2, M_2, Y_2
```

View $V_4$ groups the table Calls by the Plan_Id,Month, and Year columns, and computes aggregate information on each such group. Query $Q_4$, on the other hand, groups the table Calls only on the Plan_Id column, resulting in more coarse groups than those computed in $V_4$. However, the aggregate information of the Plan_Id groups in $Q_4$ can be computed by further aggregating the aggregate information computed for the (Plan-Id, Month, Year) groups in $V_4$, as illustrated in the following rewritten query:

```
Q_4'  SELECT    P_1, PN_1 SUM(ME_1), MAX(MC_1)
      FROM      V_a(P_1, M_1, Y_1, ME_1, MC_1),
                Calling_Plans(PI_1, PN_1)
      WHERE     P_1 = PI_1 AND Y_1 = 1995
      GROUPBY   P_1, PN_1
```

The following example illustrates that the existence of other columns in the view may enable us to recover the tuple multiplicities lost because of grouping in the view.

EXAMPLE 5

Recovery of Lost Multiplicities

Consider again the telephone company database from Example 1. The following query $Q_5$ can be used to determine the total number of calls under each calling plan in 1995:

```
Q_5:  SELECT    P_1, COUNT(CN_1)
      FROM      Calls(F_1, T_1, TI_1, D_1, M_1, Y_1, DU_1, P_1, C_1)
                Customer(PN_1, CN_1)
      WHERE     F_1 = PN_1 AND Y_1 = 1995
      GROUPBY   P_1
```

View $V_{5a}$ below maintains the total annual revenue for each customer, plan, and year:

```
V_{5a}:  SELECT    F_2, P_2, Y_2, SUM(C_2)
         FROM      Calls(F_2, T_2, TI_2, D_2, M_2, Y_2, DU_2, P_2, C_2)
         WHERE     F_2, P_2, Y_2
```

$V_{5a}$ cannot be used to evaluate $Q_5$. This is because the multiplicity of the From column of Calls is needed in order to compute COUNT($CN_1$), but that multiplicity is lost in the view $V_{5a}$. However, consider view $V_{5b}$ below.

```
V_{5b}:  SELECT    F_2, P_2, Y_2, SUM(C_2), COUNT(C_2)
         FROM      Calls(F_2, T_2, TI_2, D_2, M_2, Y_2, DU_2, P_2, C_2)
         GROUPBY   F_2, P_2, Y_2
```

Although the multiplicities of the From column are not explicit in $V_{5b}$, they can be computed using the available information, $V_{5b}$ can be used to evaluate $Q_5$ as follows:

```
Q_5'  SELECT    P_1, SUM(GC_1)
      FROM      V_{5b}(F_1, P_1, Y_1, YE_1, CG_1),
                Customer(PN_1, CN_1)
      WHERE     F_1 = PN_1 AND Y_1 = 1995
      GROUPBY   P_1
```

As the examples illustrate, to use views that involve aggregations, we need to verify that (a) the aggregate information in the view is sufficient to compute the aggregates needed in the query, and that (b) the correct multiplicities exist or can be computed. We formalize these intuitions below, present conditions for usability, and provide an algorithm to rewrite Q using V.

WITHOUT HAVING CLAUSES

To specify conditions for usability for single-block aggregation views, we need to slightly modify conditions $C_2$ 304 and $C_4$ 308 and to substantially modify condition $C_3$ 306 to deal with the different cases of aggregates appearing in the SELECT clause of the query. (Condition $C_1$ 302 is unchanged.) The modified conditions are formally presented in FIG. 9.

Since ColSel(Q) must be a subset of Groups(Q), condition $C_2^a$ 904 is a generalization of condition $C_2$ 304. Intuitively, condition $C_3^a$ 906 guarantees that the columns in the view contain enough information to compute the aggregates required in the query. In particular, condition $C_3^a$ 906 parts 1(b), 1(c) and 2 guarantee that we can recover the multiplicities in the view in order to perform an aggregation that depends on such multiplicities (i.e., either SUM or COUNT). The two parts of the condition cover the cases when the aggregation is on a column mapped by the view, and not mapped by the view, respectively. Note that the second part of condition $C_4^a$ 908 does not allow Conds' to constrain any of the columns in $\phi$(AggSel(V)). Intuitively, this is because the columns in AggSel(V) are aggregated upon in view V, and hence are not available for imposition of additional constraints in the rewritten query Q'.

Figure 10A:
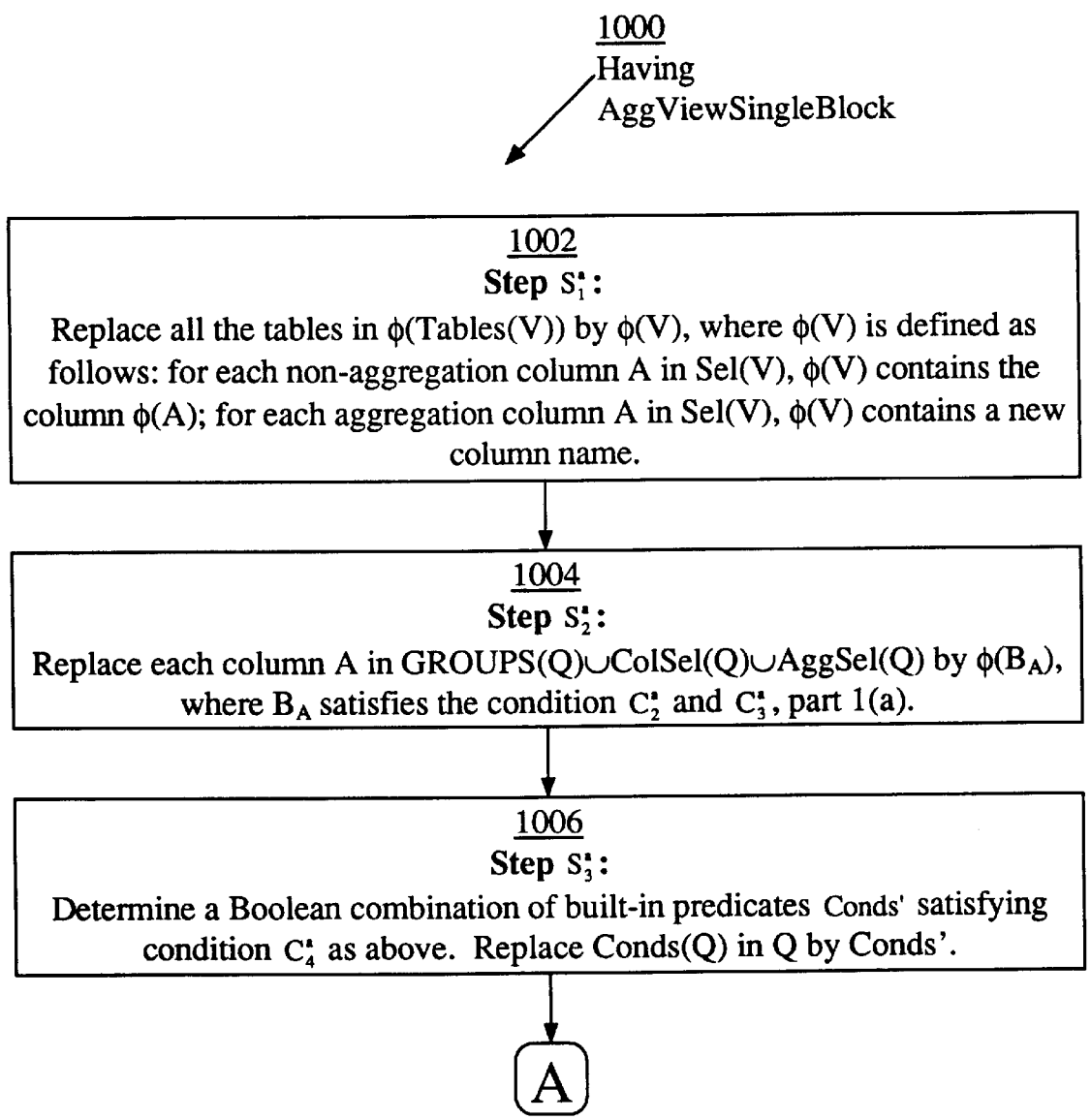
FIG. 10 is a flow diagram of a rewriting process for a single-block aggregation query without a HAVING clause, a single-block aggregation view without a HAVING clause, with a single-block rewritten query.

If conditions $C_1^a$–$C_4^a$ 902–908 are satisfied, the rewritten query Q' is obtained from Q by applying algorithm AggViewSingleBlock, presented in FIG. 10. Steps $S_1^a$ 1002, $S_2^a$ 1004, $S_3^a$ 1006 are similar to steps $S_1$ 402, $S_2$ 404 and $S_3$ 406 of algorithm ConjViewSingleBlock. Steps $S_4^a$ 1008 and $S_5^a$ 1010 deal with the various kinds of aggregation that may occur in the view and the query.

Theorem 4.1

Let Q and V be single-block aggregation queries without HAVING clauses.

If conditions $C_1^a$–$C_4^a$ are satisfied, V is usable in evaluating Q. In that case, Q', obtained by applying algorithm AggViewSingleBlock, is a rewriting of Q using V.

EXAMPLE 6

Consider again the query $Q_4$ and view $V_4$ from Example 4.1. View $V_4$ can be used to evaluate $Q_a$ since conditions $C_1^a$–$C_4^a$ are satisfied.

Condition $C_1^a$:

The 1-1 column mapping $\phi$ from $V_4$ to $Q_4$ is $\{F_2 \rightarrow F_1, T_2 \rightarrow T^1, TI_2 \rightarrow TI_1, D_2 \rightarrow D_1, M_2 \rightarrow M_1, Y_2 \rightarrow Y_1, DU_2 \rightarrow DU_1, P_2 \rightarrow P_1, C_2 \rightarrow C_1\}$.

Condition $C_2^a$:

For column $P_1$ in Groups($Q_4$), $B_{P_1}$ is the column $P_2$ in ColSel($V_4$).

Condition $C_3^a$:

For column SUM($C_1$) in Sel($Q_4$), Sel($V_4$) contains column SUM($C_2$), and for column MAX($C_1$) in Sel($Q_4$), Sel($V_4$) contains column MAX($C_2$).

Condition $C_4^a$:

Conds' is the same as Conds($Q_4$), i.e., $P_1=PI_1 \& Y_1=1995$ since no conditions are enforced in $V_4$.

The rewritten query $Q_4$ resulting from applying steps $S_1^a$–$S_5^a$ is given in Example 4.1.

EXAMPLE 7

Constraining $\phi$(AggSel(V))

Consider again the telephone database from Example 1.1. The following $Q_6$ can be used to determine the total earnings of various calling plans in 1995, considering only calls whose charge exceeds $1.

| $Q_6$: | SELECT | $P_1$, SUM($C_1$) |
|---|---|---|
| | FROM | Calls($F_1, T_1, TI_1, D_1, M_1, Y_1, DU_1, P_1, C_1$), |
| | WHERE | $Y_1 = 1995$ and $C_1 > 1$ |
| | GROUPBY | $P_1$ |

Let the view $V_6$ be the same as view $V_4$ (from Example 4.1):

| $V_6$: | SELECT | $P_2, M_2, Y_2$, SUM($C_1$), MAX($C_2$) |
|---|---|---|
| | FROM | Calls($F_2, T_2, TI_2, D_2, M_2, Y_2, DU_2, P_2, C_2$) |
| | GROUPBY | $P_2, M_2, Y_2$ |

View $V_6$ cannot be used to evaluate $Q_6$ above, although in the absence of the condition "$C_1>1$" in the WHERE clause in $Q_6$, $V_6$ could be used to evaluate $Q_6$. Intuitively, this is because the built-in predicates in the query constrain the possible values of $C_1$ and $C_2$ is aggregated upon in the view $V_6$, no condition on the result of the SUM or the MAX in $V_6$ can capture the effect of the condition on $C_1$ in $Q_6$.

With HAVING Clauses

Essentially, the additional subtleties that must be considered involve the relationships between the GROUPBY and HAVING clauses in the view V and the query Q. Intuitively, the HAVING clause in V may eliminate certain groups in V (i.e., those that do not satisfy GConds(V)). If any of these eliminated groups in V is "needed" to compute an aggregate function over a group in Q, by coalescing multiple groups in V, then V cannot be used to evaluate Q. Hence, condition $C_4^a$ 908 must be extended to test whether there exists GConds' such that GConds (Q) is equivalent to the combination of GConds(V) and GConds', taking the grouping columns Groups(V) and Groups(Q) into account.

Before checking any of the conditions for usability, the query Q and view V can be independently preprocessed to "move" maximum sets of conditions from the HAVING clause to the WHERE clause, as discussed in Section 3.3; the resulting normal form allows independent comparison of Conds(Q) and Conds(V), on the one hand, and of GConds(Q) and GConds(V), on the other.

The rewriting algorithm takes these additional refinements of the conditions of usability into account.

Specifically, step $S_3^a$ 1006 determines a GConds' in addition to Conds', using GConds(V) and GConds(Q) (resulting from the preprocessing step). Steps $S_4^a$ 1008 and $S_5^a$ 1010 are augmented to compute aggregation columns appearing in GConds(Q) in addition to those appearing in Sel(Q).

Conjunctive Query and Aggregation Views

Consider the case when the query Q is a conjunctive query (i.e., no grouping and aggregation), but the view V has grouping and aggregation. In this case the GROUPBY clause in the view results in losing information about the multiplicities of tuples, and view V cannot be used to evaluate Q if the multiset semantics is desired.

Theorem 5.1

Let Q be a conjunctive query, and V be a single-block aggregation view. Then, there is no single-block rewriting of Q using V.

The following example illustrates the problem with conjunctive queries and aggregation views:

EXAMPLE 8

Consider the telephone company database from Example 1.1. The query $Q_7$ below is used to obtain information about calls exceeding an hour in duration:

| $Q_7$: | SELECT | $F_1, D_1, M_1, Y_1$ |
|---|---|---|
| | FROM | Calls($F_1, T_1, TI_1, D_1, M_1, Y_1, DU_1, P_1, C_1$) |
| | WHERE | $DU_1 > 3600$ |

The view $V_7$ below counts the number of calls exceeding an hour in duration made by each caller on a daily basis:

| $V_7$: | SELECT | $F_2, D_2, M_2, Y_2$, COUNT($T_2$) |
|---|---|---|
| | FROM | Calls($F_2, T_2, TI_2, D_2, M_2, Y_2, DU_2, P_2, C_2$) |
| | WHERE | $DU_2 > 3600$ |
| | GROUPBY | $F_2, D_2, M_2, Y_2$ |

There is a 1-1 column mapping from $V_7$ to $Q_7$, Sel($V_7$) contains all the columns required in Sel($Q_7$), and the conditions enforced by the WHERE clauses are identical. Even through COUNT($T_2$) has the required multiplicity information, this information cannot be used in an SQL query to "replicate" the tuples in $V_7$ the appropriate number of times. Thus there is no rewriting of $Q_7$ that uses view $V_7$.

Although a specific embodiment of the present invention has been described, it will be understood by those of skill in the art that there are other embodiments which are equivalent to the described embodiment. Accordingly, it is to be understood that the invention is not to be limited by the specific illustrated embodiment, but only by the scope of the appended claims.

What is claimed is:

1. A method of evaluating a query in a database system including a materialized view, the method comprising the steps of:

receiving an input query;

semantically analyzing the materialized view to determine whether the materialized view is usable in evaluating the input query;

if the view is usable, rewriting the input query to produce an output query that is multi-set equivalent to the input query, the output query including at least one reference to the materialized view as a source of information to be returned by the output query that was not included in the input query; and evaluating the output query.

2. The method of claim 1, wherein the semantically analyzing step comprises the steps of:

determining that the materialized view does not project out any columns needed to evaluate the input query; and determining that the view does not discard any tuple that satisfies a condition enforced in the input query.

3. The method of claim 2, wherein:

the steps of semantically analyzing and rewriting are iterated, with the output query of each iteration being the input query of the next iteration; and the evaluating step is performed after the last iteration.

4. The method of claim 2, wherein:

there are a plurality of materialized views;

the steps of semantically analyzing and rewriting are iterated at least once for each of the materialized views, with the output query of each iteration being the input query of the next iteration; and the evaluating step is performed after the last iteration.

5. The method of claim 4, wherein:

the steps of semantically analyzing and rewriting are further iterated for a given one of the materialized views.

6. The method of claim 4, wherein each one of the plurality of materialized views is similar.

7. The method of claim 4, wherein at least one of the plurality of materialized views is different.

8. The method of claim 4, wherein each one of the plurality of materialized views is different.

9. The method of claim 1, wherein the materialized view does not have aggregation.

10. The method of claim 1, wherein the materialized view has aggregation.

11. A system for evaluating a query comprising:

a storage device storing a materialized view;

a receiver operable to receive an input query;

a semantic analyzer operable to analyze the materialized view to determine whether the materialized view is usable in evaluating the input query;

a query rewriting device operable to rewrite the input query to produce an output query that is multi-set equivalent to the input query, the output query including at least one reference to the materialized view as a source of information to be returned by the output query that was not included in the input query, if the view is usable; and a query evaluator operable to evaluate the output query.

12. The system of claim 11, wherein the semantic analyzer comprises:

a first analysis unit operable to determine that the materialized view does not project out any columns needed to evaluate the input query; and a second analysis unit operable to determine that the view does not discard any tuple that satisfies a condition enforced in the input query.

13. The system of claim 12, wherein:

the semantic analyzer and query rewriting device are further iteratively operable, with the output query of each iteration coupled to the input query of the next iteration; and the query evaluator is coupled to the output query of the last iteration.

14. The system of claim 12, wherein:

there are a plurality of materialized views;

the semantic analyzer and query rewriting device are further iteratively operable at least once for each of the materialized views, with the output query of each iteration coupled to the input query of the next iteration; and the query evaluator is coupled to the output query of the last iteration.

15. The system of claim 14, wherein:

the semantic analyzer and query rewriting device are further iteratively operable for a given one of the materialized views.

16. The system of claim 14, wherein each one of the plurality of materialized views is similar.

17. The system of claim 14, wherein at least one of the plurality of materialized views is different.

18. The system of claim 14, wherein each one of the plurality of materialized views is different.

19. The system of claim 11, wherein the materialized view does not have aggregation.

20. The system of claim 11, wherein the materialized view has aggregation.

21. A computer program storage device, comprising:

a computer readable medium embodying computer program instructions for evaluating a query, including:

computer program instruction means for receiving an input query;

computer program instruction means for semantically analyzing a materialized view to determine whether the materialized view is usable in evaluating the input query;

computer program instruction means for rewriting the input query to produce an output query that is multi-set equivalent to the input query, the output query including at least one reference to the materialized view as a source of information to be returned by the output query that was not included in the input query, if the view is usable; and computer program instruction means for evaluating the output query.

22. The computer program storage device of claim 21, wherein the computer program instruction means for semantically analyzing the materialized view comprises:

computer program instruction means for determining that the materialized view does not project out any columns needed to evaluate the input query; and computer program instruction means for determining that the view does not discard any tuple that satisfies a condition enforced in the input query.

23. The computer program storage device of claim 22, further comprising:

computer program instruction means for iteratively operating the computer program instruction means for semantically analyzing the materialized view and the computer program instruction means for rewriting the input query, with the output query of each iteration being the input query of the next iteration; and wherein the computer program instruction means for evaluating the output query operates after the last iteration.

24. The computer program storage device of claim 22, wherein there are a plurality of materialized views and the computer program storage device further comprises:

computer program instruction means for iteratively operating the computer program instruction means for semantically analyzing the materialized view and the computer program instruction means for rewriting the input query at least once for each of the materialized views, with the output query of each iteration being the input query of the next iteration; and wherein the computer program instruction means for evaluating the output query operates after the last iteration.

25. The computer program storage device of claim 24, wherein:

the computer program instruction means for iteratively operating the computer program instruction means for semantically analyzing the materialized view and the computer program instruction means for rewriting the input query are operable to iterate for a given one of the materialized views.

26. The computer program storage device of claim 24, wherein each one of the plurality of materialized views is similar.

27. The computer program storage device of claim 24, wherein at least one of the plurality of materialized views is different.

28. The computer program storage device of claim 24, wherein each one of the plurality of materialized views is different.

29. The computer program storage device of claim 21, wherein the materialized view does not have aggregation.

30. The computer program storage device of claim 21, wherein the materialized view has aggregation.

\* \* \* \* \*